350-96.16 SR

OR 3,870,398

United States Patent [19]

Love

[11] 3,870,398

[45] Mar. 11, 1975

[54] PASSIVE COUPLER FOR OPTICAL COMMUNICATION SYSTEM

[75] Inventor: Roy E. Love, Corning, N.Y.

[73] Assignee: Corning Glass Works, Corning, N.Y.

[22] Filed: July 5, 1973

[21] Appl. No.: 376,574

[52] U.S. Cl. .......... 350/96 C, 350/96 WG, 350/173

[51] Int. Cl. .......... G02b 5/14

[58] Field of Search .......... 350/96 R, 96 B, 96 WG, 350/169–174; 250/199

[56] References Cited

UNITED STATES PATENTS

| | | | |
|---|---|---|---|
| 1,994,531 | 3/1935 | Peck | 350/174 X |
| 3,389,950 | 6/1968 | Harper | 350/96 B |
| 3,453,036 | 7/1969 | Swope et al. | 350/96 B |
| 3,455,625 | 7/1969 | Brumley et al. | 350/169 X |
| 3,659,918 | 5/1972 | Tan | 350/171 X |
| 3,716,804 | 2/1973 | Groschwitz | 350/96 WG UX |

*Primary Examiner*—John K. Corbin
*Attorney, Agent, or Firm*—William J. Simmons, Jr.; Clarence R. Patty, Jr.

[57] ABSTRACT

An optical device for coupling optical signals to and from an optical signal transmission line. A pair of transparent prisms are connected between first and second sections of optical signal transmission line. A first surface of the first prism is parallel to and slightly spaced from a first surface of the second prism, so that a layer of air separates the two prisms. The first surface of the first prism is angularly disposed with respect to the axis of the first section of transmission line so that a portion of an optical signal from the first section of transmission line is partially reflected by that first surface. The unreflected portion of the first optical signal is twice refracted and propagates through the second prism into the second section of transmission line. A second input optical signal is directed into the second prism toward the first surface thereof at such an angle that it is substantially totally reflected from that surface into the second section of transmission line.

10 Claims, 5 Drawing Figures

PASSIVE COUPLER FOR OPTICAL COMMUNICATION SYSTEM

CROSS-REFERENCES TO RELATED APPLICATIONS

This application is related to U.S. Patent applications Ser. No. 376,578 entitled "Variable Ratio Light Coupler" and Ser. No. 376,579 entitled "Optical Coupler" both filed even date herewith and both assigned to the assignee of the present application.

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines which may consist of a single optical waveguide or a bundle thereof. Optical waveguides normally consist of an optical fiber having a transparent core surrounded by a layer of transparent cladding material having a refractive index which is lower than that of the core. Although the theory of optical waveguides has been known for some time, practical optical waveguides that do not absorb an excessive amount of transmitted light have been developed only recently. U.S. Pat. No. 3,659,915 discloses a low loss optical waveguide comprising a cladding layer of fused silica and a core of fused silica doped with one or more materials that selectively increase the index of refraction of the core above that of the cladding.

To establish between a plurality of stations an optical communications network, i.e., one employing optical signal transmission lines, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop or line data bus which drastically reduces the required amount of optical signal transmission line.

A loop data bus can be used, for example, to interconnect a plurality of stations, one of which is generally a central processing unit (CPU). This type of transmission path has no end, and data, in principle, could circulate around the path many times. In practice, attenuation is large enough that the data is not detectable after one circuit of the loop. Transmission in the loop can be unidirectional, i.e., each station transmits in one direction only, or it may be bidirectional, depending upon the type of coupler used at each station. Each station requires a light coupler for extracting from the transmission line a fraction of the optical signal propagating therein and for injecting onto the transmission line an optical signal of sufficient strength that it is detectable at each of the remaining stations.

SUMMARY OF THE INVENTION

It is an object of the present invention to provide an optical signal coupler that is capable of extracting a fraction of an optical signal from an optical signal transmission line and injecting substantially all of an input optical signal onto the transmission line.

Briefly, the present invention relates to a light coupler for use in an optical communication system including first and second optical signal transmission lines, each of which comprises at least one optical waveguide having an acceptance half angle $\beta$. Each of the transmission lines has an end portion which terminates in an endface that is substantially perpendicular to the axis of that end portion, the axes of both end portions being substantially disposed in a reference plane. The first transmission line is adapted to provide a first optical signal. In accordance with the present invention, the light coupler comprises first and second transparent members, each of which has at least first, second and third planar surfaces which lie in planes that are perpendicular to the reference plane. The first surface of the second member is parallel to and slightly spaced from the first surface of the first member. The second surface of the first member is disposed in light-receiving relationship with respect to the first optical signal radiating from the endface of the first transmission line. The angle between the axis of the first transmission line and the local perpendicular to the first surface of the first member is $\phi$. The angle between the second and third surfaces of the first member is $180°-2\phi$. The endface of the second transmission line is disposed in light-receiving relationship with respect to the second surface of the second member, which second surface is substantially perpendicular to the axis of the second transmission line. The angle between the axes of the first and second transmission lines is $\alpha/2$, where $\alpha$ is an angle greater than 0° but no greater than the angle $\beta$. A layer of air is disposed between the first and second members. Means are provided for directing a second optical signal onto the third surface of the second member, the second optical signal being directed toward the first surface of the second member at an angle $\phi + \alpha$ with respect to the local perpendicular at the first surface of the second member. The angle $\phi + \alpha$ is greater than the critical angle of the interface between the second member and air. Output means are provided for receiving that portion of the first optical signal which reflects from the first surface of the first member.

As used herein, the word "transparent" indicates transparency to those wavelengths of light that are transmitted by the optical signal transmission line in which the coupler of the present invention is connected.

DESCRIPTION OF THE PREFERRED EMBODIMENTS

Figure 1:
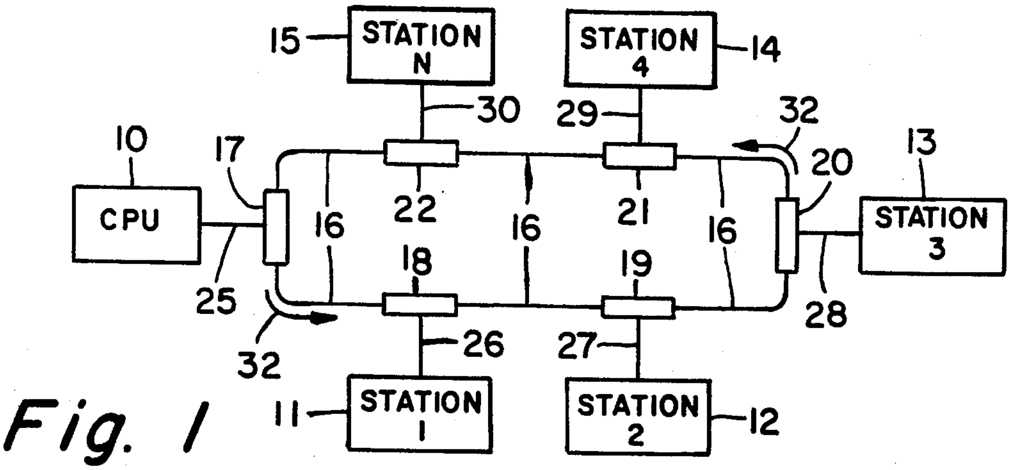
FIG. 1 is a schematic illustration in block diagram form of a loop data bus.

FIG. 1 is a schematic illustration in block diagram form of a loop data bus wherein a central processing unit 10 and a plurality of stations 11 through 15 are interconnected by an optical signal transmission line 16. Couplers 17 through 22, which are disposed between sections of transmission line 16, are utilized for injecting optical signals into and extracting optical signals from the transmission line. Lines 25 through 30 are representative of one or more auxiliary transmissions lines which interconnect each of the couplers to its associated station. In communication systems of the type illustrated in FIG. 1, optical signals generally travel in one direction as indicated by arrows 32.

Figure 2:
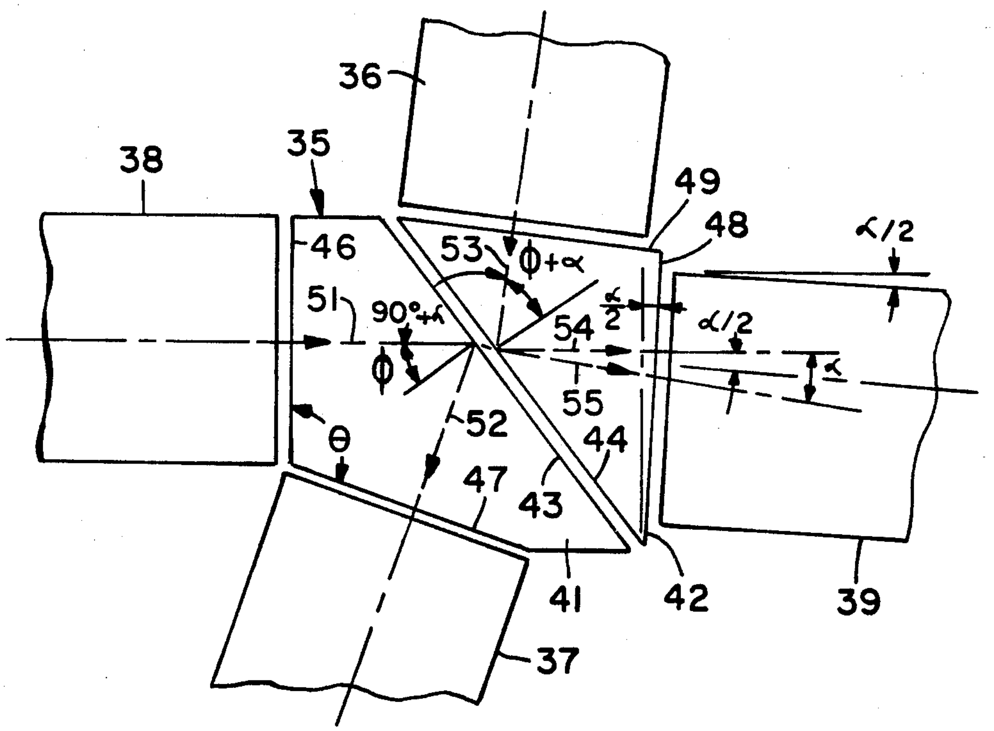
FIG. 2 is a schematic illustration of a coupler constructed in accordance with the present invention.

Couplers 17 through 22 may be of the type illustrated in FIG. 2 which is a schematic representation of the coupler of the present invention. Coupler 35 is utilized for connecting an input optical signal transmission line 36 and an output optical signal transmission line 37 to sections 38 and 39 of optical signal transmission line. The axes of transmission lines 36–39 are substantially disposed in a reference plane which, in FIG. 2, is the plane of the drawing. Each of the transmission lines consists of one or more optical waveguides having an acceptance half angle $\beta$. Coupler 35 consists of first and second transparent members 41 and 42 which are illustrated as being prisms in FIG. 2. Although prisms are the preferred configuration for the transparent members, other configurations can be employed as long as they consist of first, second and third planar surfaces that are substantially perpendicular to said reference plane and possess the characteristics described hereinbelow. A surface is considered to be planar if at least that portion thereof, which transmits or reflects light, is planar. A first planar surface 43 of prism 41 is parallel to and slightly spaced from a first planar surface 44 of prism 42, the medium between the two prisms being air. A second planar surface 46 of prism 41 is disposed in light receiving relationship with respect to transmission line 38 and is preferably perpendicular to the axis thereof. Any reference herein to the axis of an optical signal transmission line means the axis of that end portion of the transmission line that is connected to the coupler. Support or connector means generally maintain the axes of those end portions in a straight line for optimum radiation of light into a coupler or reception of light from a coupler. The coupling of light to or from a transmission line is further enhanced by terminating the transmission line in an endface that is perpendicular to the axis thereof. Prism 41 also has a third planar surface 47 which is substantially perpendicular to the axis of transmission line 37. A second planar surface 48 of prism 42 is substantially perpendicular to the axis of transmission line 39, and a third planar surface 49 of prism 42 is substantially perpendicular to the axis of transmission line 36 and is disposed in light receiving relationship therewith. Light coupling means such as refractive index matching fluid or light conducting fibers or rods may be disposed between transmission lines 37 and 38 and prism 41 and between transmission lines 36 and 39 and prism 42. Surface 48 lies in a plane that is disposed at an angle of $\alpha/2$ with respect to the plane in which surface 46 is disposed, the angle $\alpha$ being greater than 0° but no greater than the angle $\beta$. Since surface 48 is substantially perpendicular to the axis of transmission line 39, the axes of transmission lines 38 and 39 are angularly separated by the angle $\alpha/2$. Therefore, the axes of transmission lines 36 and 38 are separated by the angle $90° + \alpha$.

An optical signal propagating in transmission line 38 radiates into prism 41 as first optical signal 51 which impinges upon surface 43. The angle $\phi$ which signal 51 makes with respect to the local perpendicular to surface 43 is less than the critical angle $\phi_c$ of that interface, and a fraction of signal 51 reflects from the interface at surface 43 and propagates in transmission line 37 as indicated by dashed line 52. The remaining portion of the first optical signal 51 is twice refracted, propagates through prism 42 and into transmission line 39 as indicated by dashed line 54. Since reflected signal 52 also makes an angle $\phi$ with respect to the local perpendicular at surface 43, the angle $\theta$ between surfaces 46 and 47 should be $180°-2\phi$. A second input optical signal 53 is radiated into prism 42 from transmission line 36 and impinges upon surface 44. Due to the above described relationships between the surfaces of the prisms and the axes of the transmission lines, optical signal 53 impinges upon surface 44 at an angle $\phi + \alpha$ with respect to the local perpendicular to surface 44. The angle $\phi + \alpha$ is chosen to be greater than the critical angle $\phi_c$ of the interface between surface 44 and the adjacent layer of air so that optical signal 53 undergoes total internal reflection at that interface and enters transmission line 39 as indicated by dashed line 55.

It is preferred that the refractive indices of prisms 41 and 42 be identical, and the angular orientations of elements discussed herein are based on such a relationship. Also, to reduce Fresnel reflections, the refractive indices of prisms 41 and 42 should be equal to or closely related to those of the cores of the optical waveguides of transmission lines 36–39. Since optical signal 51 must be partially reflected and optical signal 53 must be totally reflected, and since both reflections occur at parallel interfaces, the angle between the axes of transmission lines 36 and 38 must be greater than 90°, and as indicated hereinabove, that angle is $90° + \alpha$. The directions of propagation of optical signals 54 and 55 in prism 42 are therefore separated by the angle $\alpha$. For both of these optical signals to be propagated in transmission line 39 with substantially equal efficiency, each of these signals should be directed toward the end of the axis thereof. The direction of propagation of each of the optical signals 54 and 55 should therefore deviate from the axis of transmission line 39 by the angle $\alpha/2$. This is accomplished by the above described angular orientation of transmission lines and prism faces.

Since transmission lines 36–39 consist of one or more optical waveguides which characteristically have a very low acceptance half angle $\beta$, any ray of light, which forms a part of optical signal 54 or a part of optical signal 55, which is not within the acceptance half angle of transmission line 39, will not result in the propagation of an optical signal in that transmission line. It is to be noted that while dashed lines 54 and 55 indicate the direction of propagation of the central portion of an optical signal, those optical signals also include diverging light rays since the light radiating from an optical waveguide which forms a part of transmission line 36 or 38 is not collimated. For a sufficient amount of optical signals 54 and 55 to be coupled to transmission line 39, it is preferred that the angle $\alpha$ be no greater than the acceptance half angle $\beta$ of the optical waveguide or waveguides which form transmission line 39. The geometry of the double prism coupler shown in FIG. 2 must be such that the angle $\phi + \alpha$ is greater than the angle $\phi_c$ which must be greater than angle $\phi$, the angle $\phi_c$ being the critical angle for the prism to air interface. Once the angle $\phi_c$ or the refractive index $n$ of the prism is chosen, the other may be calculated from Snell's law:

$$n \sin \phi_c = 1 \qquad (1)$$

As an example consider a coupler, the prisms of which are formed from a borosilicate glass having a refractive index of 1.474. Such a refractive index is desirable for use with fused silica waveguides of a type described in aforementioned U.S. Pat. No. 3,659,915 since this glass closely matches the refractive index of the core glass of such waveguides. Since the acceptance half angle of such fused silica waveguide fibers is about 5°, the angle $\alpha$ should be no greater than about 5°. Even if the coupler is constructed such that the angle $\alpha$ is equal to 5°, optical signals 54 and 55 will be within the numerical aperture of the waveguide fibers of transmission line 39, since both of these optical signals enter transmission line 39 at an angle of $\alpha/2$ or 2 ½° relative to the axis thereof. Using equation (1) $\phi_c$ can be determined to be 42.6°. The angle $\phi$ must be no less than 37.6°, so that the angle $\alpha$ does not exceed 5°. If the prisms are formed from the aforementioned borosilicate glass, about 21% of optical signal 51 is reflected from the interface at surface 43, if the angle $\phi$ is chosen to be 37.6°, and the percentage of the input signal that is reflected may be any value between 21% and 100% for values of $\phi$ between 37.6° and 42.6°.

Figures 3, 4, 5:
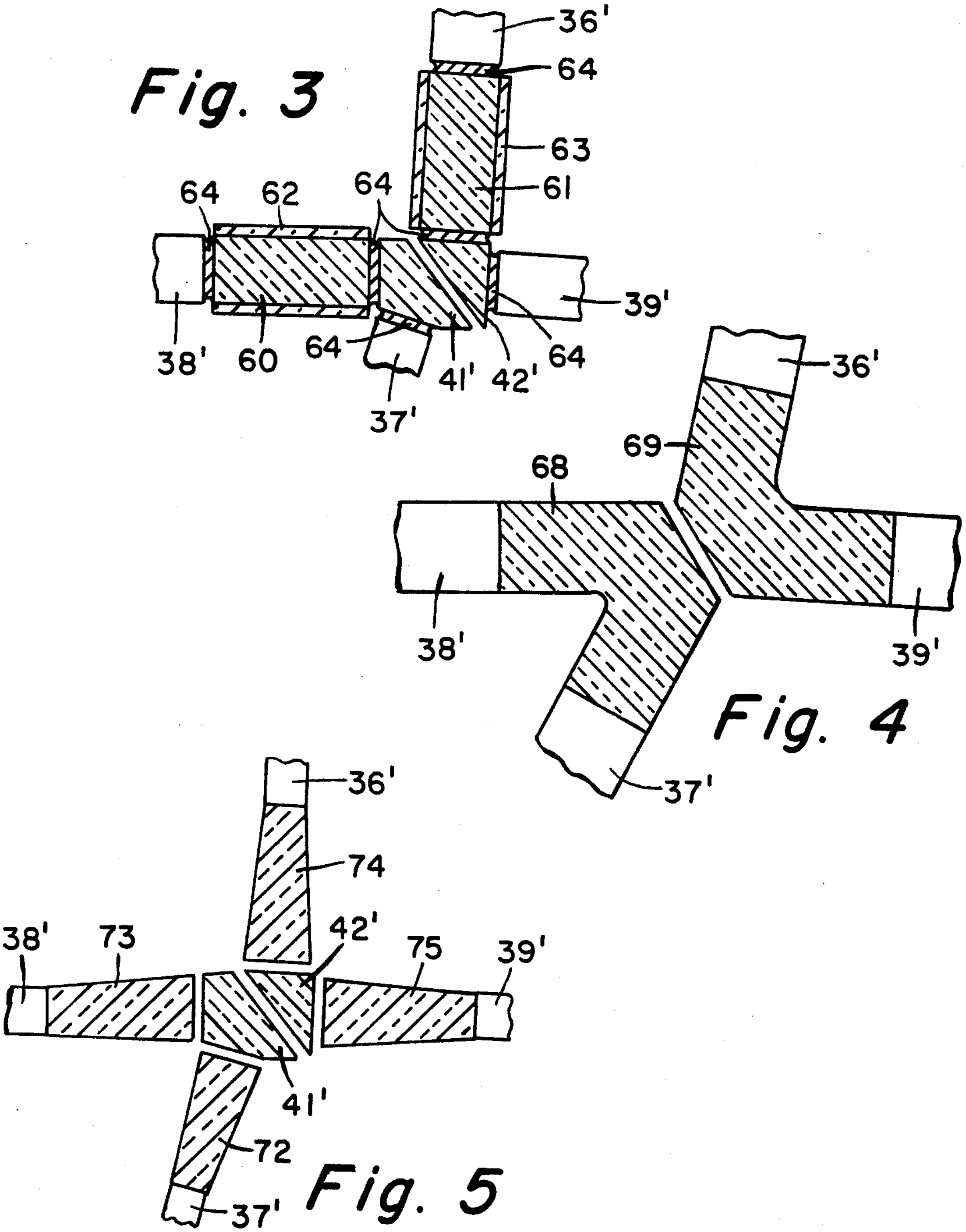
FIG. 3 is a cross-sectional view of an embodiment of the present invention which incorporates light-coupling rods.
FIG. 4 is a cross-sectional view of a further embodiment comprising a pair of V-shaped members.
FIG. 5 is a cross-sectional view of a further embodiment employing tapered light coupling means.

If transmission lines 36 through 39 consist of multiwaveguide bundles, these transmission lines can remain functional even though a few of the waveguides in each bundle are broken. To insure that each of the fibers in transmission lines 37 and 39 receive substantially equal illumination, even if some of the fibers in transmission lines 36 and 38 are broken, optical mixers may be added to the basic double prism arrangement as illustrated in FIG. 3 wherein elements similar to those of FIG. 2 are represented by primed reference numerals. In this embodiment a mixer rod 60 is disposed between transmission line 38' and prism 41', and mixer rod 61 is disposed between transmission line 36' and prism 42'. Rods 60 and 61 may be formed from any transparent material such as glass or plastic and are preferably formed from a material having a refractive index which matches or closely approximates that of the cores of the optical waveguides employed in the transmission lines. In order to provide the sidewalls of rods 60 and 61 with good light reflecting interfaces, they may be clad with layers 61 and 63, respectively, of transparent material having a refractive index lower than that of the rods. Alternatively, the rods may be provided with a reflective film of aluminum, silver or the like, or they may be suspended in air. FIG. 3 further illustrates that layers 64 of refractive index matching fluid may be disposed between various light conducting elements to reduce Fresnel reflections. Mixer rods may also be disposed between transmission line 37' and prism 41' and between transmission line 39' and prism 42', but for the sake of simplicity, these mixers are omitted.

A further modification of the embodiment of FIG. 2 is illustrated in FIG. 4 wherein the elements similar to those of FIG. 2 are represented by primed reference numerals. As shown in FIG. 4, the mixers and prisms may be of unitary construction and may thus appear as V-shaped transparent members 68 and 69. Rods 68 and 69 are illustrated as being surrounded by air, in which case the surfaces thereof should be ground and polished to form good light-reflecting interfaces.

As mentioned hereinabove, optical signals radiating from waveguides 36 and 38 of FIG. 2 are not well collimated, and therefore, some of the optical signals propagating between transmission line 38 and transmission lines 37 and 39 and between transmission line 36 and transmission line 39 will be lost due to the divergence of those signals. In general, a diverging beam of light will emanate from each waveguide fiber in a bundle of such fibers. Therefore, some of the light leaving transmission line 38, for example, will not strike the endfaces of transmission lines 37 and 39. One method of decreasing the amount of an optical signal which is lost due to divergence of the light beam is to employ slightly tapered mixer rods as illustrated in FIG. 5, wherein elements similar to those of FIG. 2 are represented by primed reference numerals. Prism 41' is connected to transmission lines 37' and 38' by tapered rods 72 and 73, respectively. Prism 42' is connected to transmission lines 36' and 39' by tapered rods 74 and 75, respectively. Tapered rods 72 and 73 have the property of decreasing the angle that an incident ray makes with the axis thereof by twice the taper angle of the rod. The extent to which light emerging from a mixer is confined within an envelope defined by the taper angle of the tapered rod depends upon the numerical aperture of the optical waveguide or waveguides at the input end of the tapered rod and the length thereof. For example, assume that transmission line 38' consists of a 50 mil diameter bundle of optical fibers of the type described in the aforementioned U.S. Pat. No. 3,659,915. The numerical aperture of such waveguides is about 0.14. If tapered rod 73 were 1.43 inches long, all of the light emanating from the large endface thereof will be confined to an envelope defined by the 2° taper. The larger prisms needed to accommodate tapered mixer rods are easier to grind, polish and mount in a fixture, and are therefore more desirable from a fabrication viewpoint.

Converging mixer rods 72 and 75 couple light from prisms 41' and 42', respectively, to transmission lines 37' and 39'. These converging mixer rods tend to reverse whatever collimation was achieved by the preceding diverging mixer rod. Thus, light entering transmission lines 37' and 39' will have approximately the same angular intensity distribution as light leaving transmission lines 36' and 38' and therefore, it will be within the acceptance angle of the optical waveguide fibers which form transmission lines 37' and 39'.

I claim:

1. A light coupler for use in an optical communication system including first and second optical signal transmission lines, each of which comprises at least one optical waveguide having an acceptance half angle $\beta$, each of said transmission lines having an end portion which terminates in an endface that is substantially perpendicular to the axis of said end portion, the axes of said end portions being substantially disposed in a reference plane, said first transmission line being adapted to provide a first optical signal, said light coupler comprising first and second transparent members, each of which has at least first, second and third planar surfaces which lie in planes that are perpendicular to said reference plane, said first surface of said second member being parallel to and slightly spaced from said first surface of said first member, said second surface of said first member being disposed in light-receiving relationship with respect to the first optical signal radiating from said endface of said first transmission line, the angle between the axis of said first transmission line and the local perpendicular to said first surface of said first member being $\phi$, the angle between said second and third surfaces of said first member being $180°-2\phi$, said endface of said second transmission line being disposed in light-receiving relationship with respect to said second surface of said second member, said second surface of said second member being substantially perpendicular to the axis of said second transmission line, the angle between the axes of said first and second transmission lines being $\alpha/2$, where $\alpha$ is an angle greater than 0° but no greater than the angle $\beta$, a layer of air disposed between said first surfaces of said first and second members, means for directing a second optical signal onto said third surface of said second member, said second optical signal being directed toward said first surface of said second member at an angle $\phi + \alpha$ with respect to the local perpendicular at said first surface of said second member, the angle $\phi + \alpha$ being greater than the critical angle of the interface between said second member and air, and output means for receiving that portion of said first optical signal which reflects from said first surface of said first member, the remaining portion of said first optical signal being transmitted across said layer of air and into said second member.

2. A light coupler in accordance with claim 1 further comprising first light coupling means disposed between said first transmission line and said second surface of said first member, second light coupling means disposed between said means for directing a second optical signal and said third surface of said second member, third light coupling means disposed between said third surface of said first member and said output means, and fourth light coupling means disposed between said second surface of said second member and said second transmission line.

3. A light coupler in accordance with claim 2 wherein said first and second light coupling means respectively comprise first and second rods of transparent material having first and second opposed endfaces perpendicular to the axes thereof, said second endface of said first rod being disposed adjacent to said second surface of said first member and said second endface of said second rod being disposed adjacent to said third surface of said second member.

4. A light coupler in accordance with claim 3 furthere comprising a layer of light-reflecting material disposed on the surfaces of said first and second rods.

5. A light coupler in accordance with claim 3 wherein said third and fourth light coupling means respectively comprise third and fourth elongated rods of transparent material having first and second opposed endfaces perpendicular to the axes thereof, said second endface of said third rod being disposed adjacent to said third surface of said first member and said second endface of said fourth rod being dipsosed adjacent to said second surface of said second member.

6. A light coupler in accordance with claim 5 wherein said rods are tapered, said second endfaces being larger than first endfaces.

7. A light coupler in accordance with claim 6 wherein said first and second members are prisms.

8. A light coupler in accordance with claim 7 wherein said output means comprises an optical signal transmission line.

9. A light coupler in accordance with claim 8 wherein said means for directing comprises an optical signal transmission line.

10. A light coupler in accordance with claim 1 wherein said first and second members are V-shaped.

* * * * *